(12) United States Patent
Tchilian

(10) Patent No.: US 10,761,182 B2
(45) Date of Patent: Sep. 1, 2020

(54) STAR TRACKER FOR MULTIPLE-MODE DETECTION AND TRACKING OF DIM TARGETS

(71) Applicant: Ball Aerospace & Technologies Corp., Boulder, CO (US)

(72) Inventor: Emil Tchilian, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/693,992

(22) Filed: Nov. 25, 2019

(65) Prior Publication Data

US 2020/0174094 A1    Jun. 4, 2020

Related U.S. Application Data

(60) Provisional application No. 62/774,719, filed on Dec. 3, 2018.

(51) Int. Cl.

| | |
|---|---|
| *G06K 9/00* | (2006.01) |
| *G01S 5/16* | (2006.01) |
| *G01C 21/02* | (2006.01) |
| *G01S 3/78* | (2006.01) |
| *G01S 3/781* | (2006.01) |
| *B64G 1/24* | (2006.01) |

(52) U.S. Cl.
CPC ............ *G01S 5/163* (2013.01); *G01C 21/025* (2013.01); *G01S 3/781* (2013.01); *G01S 3/7803* (2013.01); *B64G 1/244* (2019.05)

(58) Field of Classification Search
None
See application file for complete search history.

(56) References Cited

U.S. PATENT DOCUMENTS

| 5,719,794 A | 2/1998 | Altshuler et al. |
| 5,960,391 A | 9/1999 | Tateishi et al. |
| (Continued) | | |

OTHER PUBLICATIONS

U.S. Appl. No. 16/597,411, filed Oct. 9, 2019, Schmidt et al.
(Continued)

*Primary Examiner* — Atiba O Fitzpatrick
(74) *Attorney, Agent, or Firm* — Sheridan Ross P.C.

(57) ABSTRACT

Multiple mode star tracker methods and systems in which attitude information and image information is generated are provided. The multiple mode star tracker includes a detector having a plurality of pixels arranged in a focal plane array. The detector is operated to obtain multiple image frames from within a field of view containing a plurality of stars. For each of the image frames, the attitude of the detector and in turn the attitude of each pixel is determined. Based on the attitude quaternion of the individual pixels within a plurality of frames, image data from the plurality of frames is co-added or stacked to form a composite image. The co-addition of multiple frames of image data enables or facilitates the detection of dim objects by the multiple mode star tracker. Moreover, embodiments of the present disclosure enable the attitude quaternion for individual pixels within individual frames to be determined using the multiple mode star tracker function of the instrument, and without requiring attitude information provided by a separate device, such as a gyroscope.

20 Claims, 4 Drawing Sheets

(56) References Cited

U.S. PATENT DOCUMENTS

| | | | |
|---|---|---|---|
| 6,075,991 | A | 6/2000 | Raleigh et al. |
| 6,437,692 | B1 | 8/2002 | Petite et al. |
| 6,597,394 | B1 | 7/2003 | Duncan et al. |
| 6,820,053 | B1 | 11/2004 | Ruwisch |
| 7,020,501 | B1 | 3/2006 | Elliott et al. |
| 7,590,098 | B2 | 9/2009 | Ganesh |
| 8,019,544 | B2 | 9/2011 | Needelman et al. |
| 8,583,371 | B1 | 11/2013 | Goodzeit et al. |
| 8,929,936 | B2 | 1/2015 | Mody et al. |
| 9,073,648 | B2 | 7/2015 | Tsao et al. |
| 9,191,587 | B2 | 11/2015 | Wright et al. |
| 9,294,365 | B2 | 3/2016 | Misra et al. |
| 9,449,374 | B2 | 9/2016 | Nash et al. |
| 9,702,702 | B1 | 7/2017 | Lane et al. |
| 9,924,522 | B2 | 3/2018 | Gulati et al. |
| 9,927,510 | B2 | 3/2018 | Waldron et al. |
| 10,021,313 | B1 | 7/2018 | Chen et al. |
| 10,048,084 | B2 | 8/2018 | Laine et al. |
| 10,271,179 | B1 | 4/2019 | Shima |
| 2005/0049876 | A1 | 3/2005 | Agranat |
| 2005/0228660 | A1 | 10/2005 | Schweng |
| 2006/0030332 | A1 | 2/2006 | Carrott et al. |
| 2007/0010956 | A1 | 1/2007 | Nerguizian et al. |
| 2008/0045235 | A1 | 2/2008 | Kennedy et al. |
| 2008/0293353 | A1 | 11/2008 | Mody et al. |
| 2009/0197550 | A1 | 8/2009 | Huttunen et al. |
| 2009/0268619 | A1 | 10/2009 | Dain et al. |
| 2012/0071105 | A1 | 3/2012 | Walker et al. |
| 2012/0072986 | A1 | 3/2012 | Livsics et al. |
| 2012/0163355 | A1 | 6/2012 | Heo et al. |
| 2012/0202510 | A1 | 8/2012 | Singh |
| 2012/0238201 | A1 | 9/2012 | Du et al. |
| 2012/0238220 | A1 | 9/2012 | Du et al. |
| 2014/0236401 | A1* | 8/2014 | Tsao .................. B64G 3/00 701/13 |
| 2014/0282783 | A1 | 9/2014 | Totten et al. |
| 2014/0329540 | A1 | 11/2014 | Duggan et al. |
| 2015/0009072 | A1 | 1/2015 | Nijsure |
| 2016/0173241 | A1 | 6/2016 | Goodson et al. |
| 2017/0120906 | A1 | 5/2017 | Penilla et al. |
| 2017/0366264 | A1* | 12/2017 | Riesing .................. G01S 3/786 |
| 2018/0019910 | A1 | 1/2018 | Tsagkaris et al. |
| 2018/0025641 | A1 | 1/2018 | LaVelle et al. |
| 2018/0082438 | A1* | 3/2018 | Simon .................. G06T 7/74 |
| 2018/0107215 | A1 | 4/2018 | Djuric et al. |
| 2018/0149730 | A1 | 5/2018 | Li et al. |
| 2018/0324595 | A1 | 11/2018 | Shima |
| 2019/0122689 | A1 | 4/2019 | Jain et al. |
| 2019/0363430 | A1 | 11/2019 | Wang et al. |

OTHER PUBLICATIONS

U.S. Appl. No. 16/668,826, filed Oct. 30, 2019, Shima.
U.S. Appl. No. 16/745,725, filed Jan. 17, 2020, Tchilian et al.
U.S. Appl. No. 16/806,367, filed Mar. 2, 2020, Frye et al.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
International Search Report and Written Opinion for International (PCT) Patent Application No. PCT/US2019/063055, dated Feb. 25, 2020 18 pages.

* cited by examiner

STAR TRACKER FOR MULTIPLE-MODE DETECTION AND TRACKING OF DIM TARGETS

CROSS-REFERENCE TO RELATED APPLICATIONS

This application claims the benefit of U.S. Provisional Patent Application Ser. No. 62/774,719, filed Dec. 3, 2018, the entire disclosure of which is hereby incorporated herein by reference.

FIELD

Star tracker devices and methods for providing attitude information and for detecting and tracking dim targets are provided.

BACKGROUND

Star trackers continue to play a key role in spacecraft guidance and control systems. A star tracker is fundamentally a camera that images a star field and computes and reports the direction the star tracker boresight is pointing (its attitude). Like all components used in space missions, there is continuous pressure to reduce size, weight, power and cost (SWAP-C) and increase the lifetime of these components without compromising performance. A tracker must be rugged enough to survive the stresses of launch and then function for many years in the extreme temperatures and radiation encountered in the harsh environment of space. Star trackers are typically mounted on the external surface of a spacecraft bus and are not shielded from the environment.

First generation star trackers utilized imaging tube technologies and analog electronics. Charge-coupled-devices (CCDs) brought much greater optical sensitivity, and the digital electronics which supplanted the analog circuitry in second-generation trackers enabled more sophisticated algorithms, greatly increasing their performance. CCD sensors, however, require special electronics for control and clocking the image sensor, and an external analog to digital converter (ADC) to digitize the CCD output signal. Further, a CCD's performance degrades when subjected to the space proton environment and they are susceptible to transient effects from high energy particles encountered in space.

The advent of CMOS imaging sensors brought the promise of increased radiation hardness of the imager through the use of silicon-on-insulator (SOI) structures to reduce the volume of active silicon in the imaging sensor. CMOS sensors also integrate the clocking and ADC circuitry on the same die, reducing the number of electronic components required and therefore reducing the SWAP of the trackers. However, trackers using earlier CMOS imagers suffered in performance since the sensors were front-side illuminated (FSI), which significantly reduced their sensitivity. The use of micro-lenses partly counteracts the lower sensitivity of FSI CMOS imagers, but reduce the accuracy of the computed stellar image centroids. Also, the first CMOS star tracker sensors used less sophisticated pixel designs and relied on a simple rolling-shutter readout scheme that resulted in a skewed readout time of the imaged stars across the array.

More recently, CMOS sensor vendors are producing sophisticated back-side illuminated (BSI) CMOS imaging sensors, which feature fundamentally improved sensitivity. BSI sensor designs result in the entire surface of the imaging sensor being light sensitive, greatly improving the sensor's quantum efficiency and fill-factor while eliminating the need for micro-lenses. Newer sensors use more sophisticated CMOS pixel designs featuring higher transistor count, pinned photodiodes and transfer gates to provide 'snapshot' or global shutter readout. In this mode, all pixels in the array integrate signal for the same absolute time period. A modern star tracker can also benefit from continuing advances in electronics integration. A tracker which utilizes an application specific integrated circuit (ASIC) would have significant computational power with low SWAP.

In a typical implementation of a star tracker incorporating a digital image sensor, the sensor includes an array of pixels that is used to obtain an image from within a field of view of the device defined by the size of the sensor and associated imaging optics. The relative location of identified stars within the image, and the line of sight of the device, enable a relative location of a platform carrying the star tracker device to be determined. However, star trackers have been limited to detecting relatively bright stars in order to provide attitude information.

SUMMARY

Multiple mode star tracker devices and methods in accordance with embodiments of the present disclosure provide for attitude determination, and additionally for the detection of dim objects within an image area. The image sensor of the multiple mode star tracker features a global shutter, ensuring that each pixel of the sensor integrates signal for the same absolute time period, allowing for the precise combining or stacking of multiple image frames obtained by the image sensor. Moreover, embodiments of the present disclosure register every pixel within a full frame of image data with respect to an inertial reference frame (IRF). More particularly, the attitude quaternion is used to register each pixel in the collected series of image frames or video with respect to an IRF during some spatial motion of the focal plane. The spatial motion of the platform and the spatial motion of each pixel in the video is registered via the quaternion. Postprocessing of multiple video frames, where each pixel is registered to an IRF, further allows stacking of these frames in order to significantly boost signal-to-noise ratio (SNR). Through this process, multiple frames can be stacked, enabling the detection of very dim objects. Accordingly, full frame imaging and simultaneous attitude determination is enabled.

A multiple mode star tracker in accordance with embodiments of the present disclosure can include a digital image sensor in the form of a focal plane array having a relatively large number of pixels. For example, the focal plane array can include a back side illuminated CMOS device having over 1 million pixels arranged in a two-dimensional array. The pixels are operated according to a global shutter. The multiple mode star tracker as disclosed herein can additionally include a lens assembly that focuses collected light onto the focal plane array. Frames of image data are stored in memory or data storage. A processor executes instructions for determining an attitude of the multiple mode star tracker for each frame of image data from that image data. Accordingly, a gyroscope is not required. Moreover, the attitude quaternion for each pixel of the image sensor can be determined for each frame. The processor can further operate to combine or stack multiple frames of image data, where pixels within the stacked image frames are aligned with one another according to their corresponding attitude quaternion, to enable the detection of dim objects within the field of view of the multiple mode star tracker. Accordingly, a multiple mode star tracker as disclosed herein can provide image information, for example in connection with space situational awareness (SSA) applications, using the same sensor and optical components as are used for performing the star tracker function.

A method for detecting dim objects using a star multiple mode tracker includes collecting multiple frames of image data from within a field of view of the multiple mode star tracker. Image data from stars visible within an individual frame is used to determine the attitude of the multiple mode star tracker at the time that image data was collected, which in turn allows the attitude quaternion for each individual pixel to be determined. By thus determining the attitude quaternion of each pixel within each frame of image data, the image data from many individual image frames can be accurately combined or stacked, enabling dim objects within the field of view of the multiple image frames to become visible.

Additional features and advantages of embodiments of the present disclosure will become more readily apparent from the following description, particularly when taken together with the accompanying drawings.

DETAILED DESCRIPTION

Figure 1:
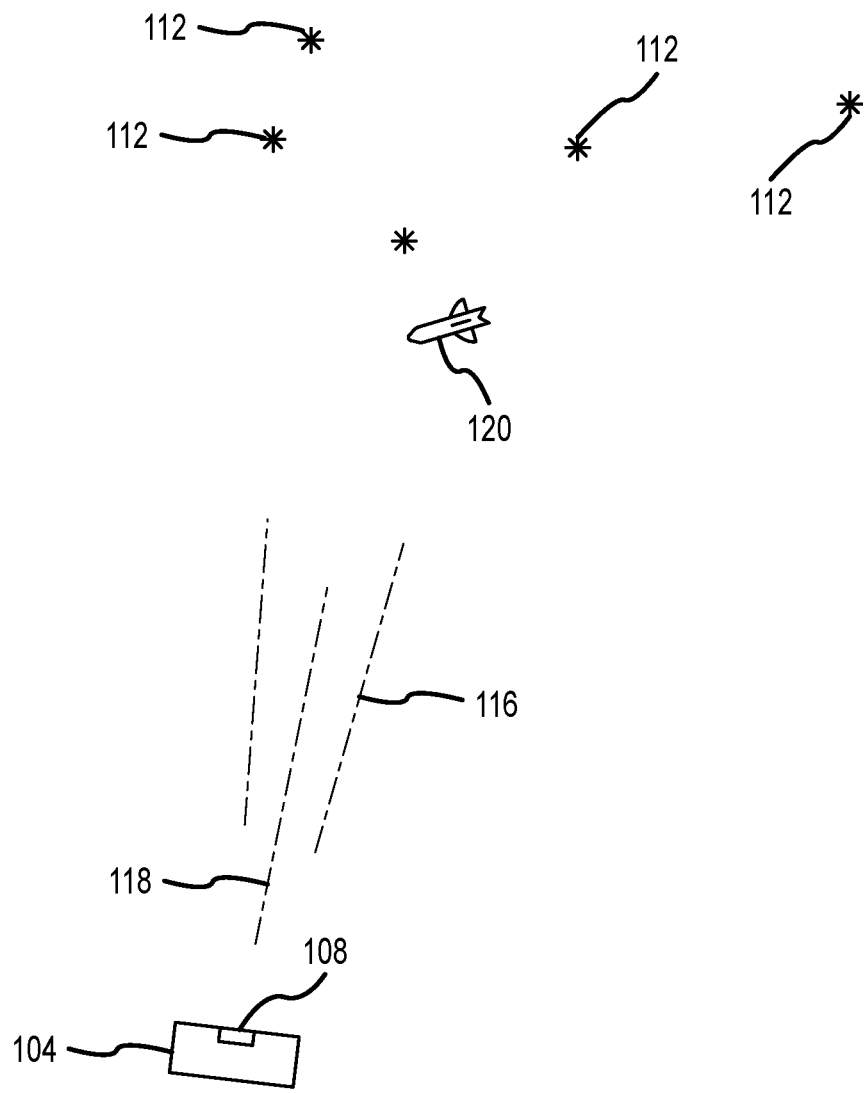
FIG. 1 depicts an example scenario in which a multiple mode star tracker in accordance with embodiments of the present disclosure is used to determine an attitude of a platform and to detect dim objects.

FIG. 1 depicts a platform 104 carrying a multiple mode star tracker 108 in accordance with embodiments of the present disclosure. As used herein, a platform 104 can include, but is not limited to, a satellite, a manned spacecraft, an interplanetary spacecraft, an interstellar spacecraft, an orbiter, a lander, an aircraft, a balloon, a stratospheric balloon, a ship, or any other platform or device to which a multiple mode star tracker 108 can be mounted or associated. The multiple mode star tracker 108 images a plurality of stars 112 within a field of view 116 of the multiple mode star tracker 108. The field of view 116 is associated with a line of sight or boresight 118. Although depicted with a single field of view 116, a multiple mode star tracker 108 can have multiple fields of view 116. Alternatively or in addition, a platform 104 can be associated with a plurality of multiple mode star trackers 108 having the same or different fields of view 116. As described herein, the multiple mode star tracker 108 enables attitude determination in a time tagged format, and with registration of every pixel within a frame relative to an inertial reference frame (IRF). Moreover, in accordance with embodiments of the present disclosure, the multiple mode star tracker 108 enables stacking of multiple image frames in order to significantly boost the signal-to-noise ratio (SNR) of the device, allowing the detection of dim objects 120, such as a distant star, or some other object, such as a space craft, space junk, a meteoroid, or any other object within a field of view 116 that is not visible or that is not distinct within a single frame of image data. Accordingly, a multiple mode star tracker 108 as described herein can provide position information at the same time that it collects image information, including but not limited to image information concerning dim objects 120.

Figure 2:
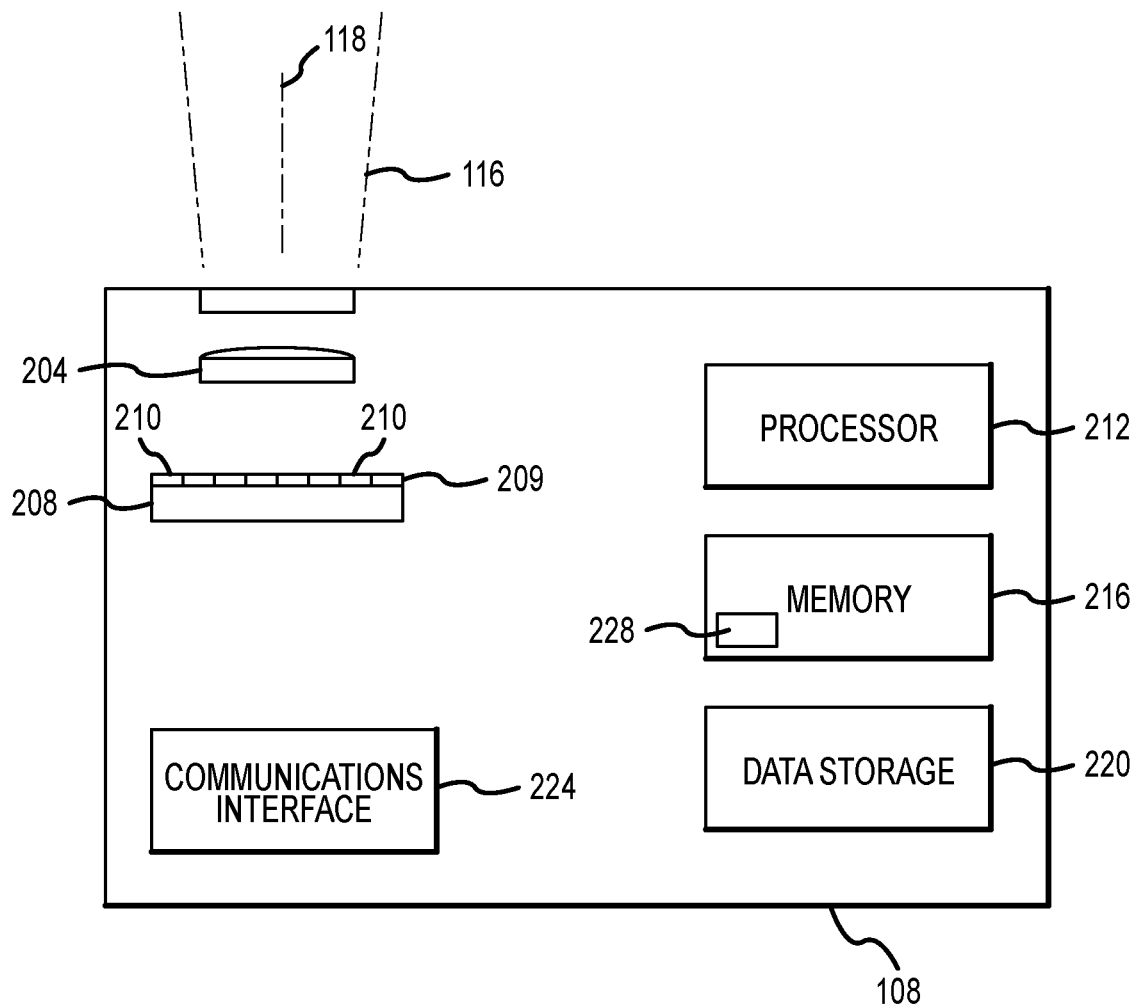
FIG. 2 depicts components of a multiple mode star tracker in accordance with embodiments of the present disclosure.

FIG. 2 depicts components of a multiple mode star tracker 108 in accordance with embodiments of the present disclosure. In general, the multiple mode star tracker 108 includes a lens assembly or system 204 oriented to collect light along or within a field of view 116. The collected light is directed to a detector or sensor 208 having a focal plane array 209 incorporating a number of pixels 210 arranged in a two-dimensional array. As an example, but without limitation, the detector 208 can include a backside illuminated CMOS image sensor having a 1024×1024 array of pixels. As can be appreciated by one of skill in the art after consideration of the present disclosure, in addition to a focal plane array formed from a plurality of photosensitive sites or pixels, the detector 208 can incorporate or be associated with driver and analog to digital conversion (ADC) circuitry, enabling the detector 208 to provide a digital output representative of an amplitude or intensity of light detected at each pixel within the detector 208. In accordance with embodiments of the present disclosure, the detector 208 features a global shutter capability or function, enabling each pixel 210 to have the same absolute exposure period within a given frame of image data collected by the detector 208.

The multiple mode star tracker 108 additionally includes a processor 212, memory 216, data storage 220, and a communications interface 224. The processor 212 can include a general purpose programmable processor, graphics processing unit, a field programmable gate array (FPGA), application specific integrated circuit (ASIC), controller, or other processing device or set of devices capable of executing instructions for operation of the multiple mode star tracker 108. The instructions executed by the processor 212 can be stored as application programming 228 in the memory 216 and/or data storage 220. The memory 216 can include one or more volatile or nonvolatile solid-state memory devices, such as but not limited to RAM, SDRAM, or the like. The data storage 220 can include one or more mass storage devices, such as, but not limited to, a hard disk drive, an optical storage device, a solid-state drive, or the like. In addition to providing storage for the application programming 228, the memory 216 and/or the data storage 220 can store intermediate or final data products or other data or reference information, such as but not limited to navigational information, a star database, attitude and timing information, and image data. The communications interface 224 can operate to transmit and receive instructions and data between the multiple mode star tracker 108 and other devices, communication nodes, control entities, or the like that are located on the platform 104 or that are located remotely relative to the platform. For instance, the communications interface 224 can provide image data from one or a plurality of aggregated frames collected by the detector 208 and combined or stacked as described herein to an output device, storage device, or a processing system. As examples, the communications interface 224 can include a radio, optical communication system, serial interface, network interface, or the like.

Figure 3:
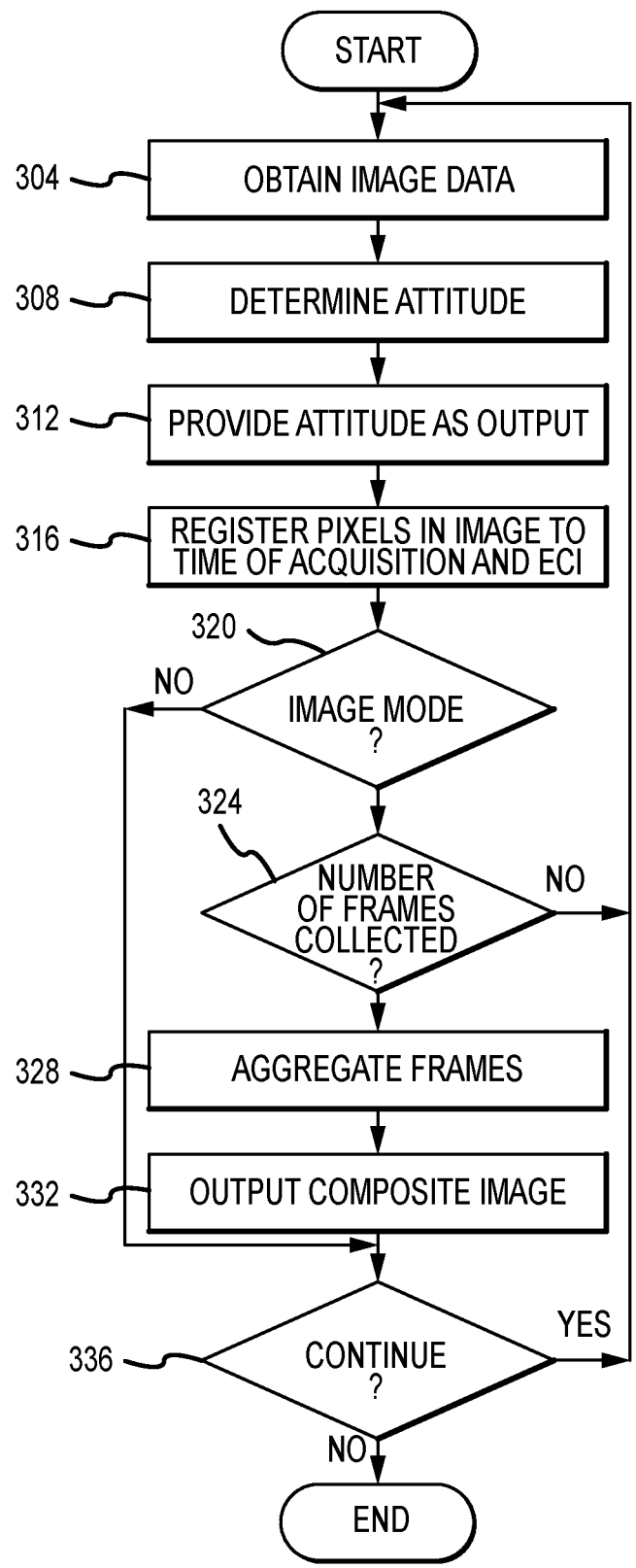
FIG. 3 is a flowchart depicting aspects of a method for detecting dim objects in accordance with embodiments of the present disclosure.

FIG. 3 is a flowchart depicting aspects of a method for detecting dim objects in accordance with embodiments of the present disclosure. The method can be executed in connection with implementing or operating a multiple mode star tracker 108 as described herein. Initially, at step 304, the multiple mode star tracker 108 is operated to obtain a frame of image data from within a field of view 116 that encompasses a plurality of stars 112. The frame of image data is then processed and compared to reference information, to identify at least some of the stars 112 within the field of view 116 of the multiple mode star tracker 108, and to thereby determine the attitude of the multiple mode star tracker 108 (step 308). As can be appreciated by one of skill in the art after consideration of the present disclosure, processing the frame of image data to determine the attitude of the multiple mode star tracker 108 can include matching the relative locations and intensities of stars 112 within the field of view 116 to navigational information comprising a database of star locations and intensities stored in memory 216 and/or data storage 220. An output of the determined overall attitude of the multiple mode star tracker 108 can then be provided (step 312). As can be appreciated by one of skill in the art after consideration of the present disclosure, the determined overall attitude of the multiple mode star tracker 108 can be expressed as the attitude quaternion of the boresight 118 of the multiple mode star tracker 108 in terms of an earth centered inertial (ECI) coordinate frame. Moreover, the determined attitude can be tagged with the time at which the image data of the frame was acquired. The boresight 118 of the multiple mode star tracker 108 can be defined relative to a selected pixel of the detector 208 array, such as a pixel at or near the center of the array (hereinafter referred to simply as the center pixel). From the determined attitude quaternion for the center pixel or boresight 118, and knowing the positions of the remaining pixels relative to the center pixel, the quaternions for all of the remaining pixels can be derived and and can be registered to the ECI coordinate frame (step 316). Accordingly, embodiments of the present disclosure register each pixel 210 of the detector 308 array 209 within an image frame to the ECI coordinate frame using the attitude quaternion of the center pixel (the slew vector of the multiple mode star tracker 108 on the platform 104) at the time the image frame is collected.

At step 320, a determination can be made as to whether the multiple mode star tracker 108 is to be operated in an image capture mode. In accordance with embodiments of the present disclosure, and in particular in connection with operation of the multiple mode star tracker 108 to obtain image information, a sequence of images can be obtained at some minimum frame rate. As an example, but without limitation, the minimum imaging frame rate may be 10 Hz or greater. Moreover, in order to detect very dim objects, some minimum number of frames can be collected. As an example, but without limitation, from 20 to 2000 frames of image data can be collected. Accordingly, at step 324, a determination can be made as to whether a minimum number of image frames have been collected. The minimum number of image frames can be a fixed value, or can be variable, for example dependent upon a desired sensitivity level or sets of sensitivity levels. As still another example, the minimum number of frames can be determined dynamically. For instance, a neural network, human observer, threshold detector, or other control or process can determine the minimum number of frames based on whether a dim object 120 becomes visible.

Figure 4:
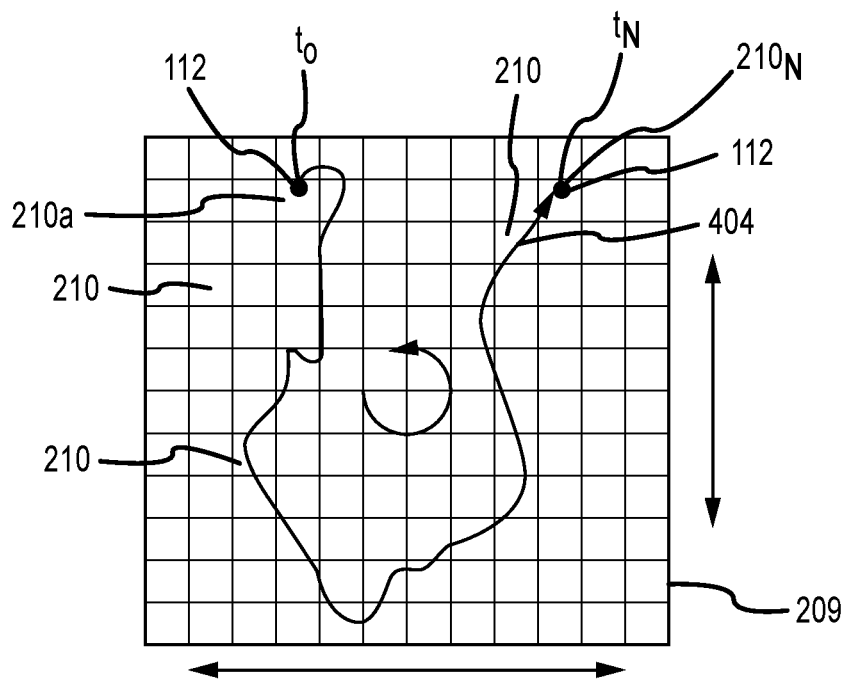
FIG. 4 depicts an example motion trajectory of a focal plane during a period of time.

As can be appreciated by one of skill in the art after consideration of the present disclosure, the collection of multiple frames of image data, even where the frame rate is relatively high, will be accompanied by some movement of the focal plane array 209 of the detector 208 relative to the ECI coordinate frame. An example motion trajectory 404 of the focal plane array 209 relative to a star 112 over a period of time starting at time to and ending at time $t_N$ is depicted in FIG. 4. In particular, at time to, a star 112 is in an area of the focal plane array 209 corresponding to a first pixel 210a, at intermediate times the star 112 appears in areas of the focal plane array 209 corresponding to other pixels 112, and finally at time to the star 112 appears in an area of the focal plane array 209 corresponding to an nth pixel 210n. In addition, it should be appreciated that the motion trajectory 404 can dwell over a single pixel or set of pixels 210, or can cross the same pixel or set of pixels 210. as a result of the movement of the focal plane array 209 relative to the coordinate frame, it is necessary to align the multiple frames of image data along a common field of view 116, in order for the information from within overlapping areas of the multiple frames to be aggregated, such that dim objects 120 within the multiple frames of image data can be detected. In particular, the identity of a pixel 210 having a line of sight intersecting a particular object 112 or 120 within the field of view 116 of the multiple mode star tracker 108 will change as the attitude of the detector 208 focal plane array 209 changes. Therefore, in order to ensure that signals from the pixels 210 of the detector 208 are accurately registered, it is necessary to register the pixels 210 relative to the IRF from frame to frame.

Figure 5:
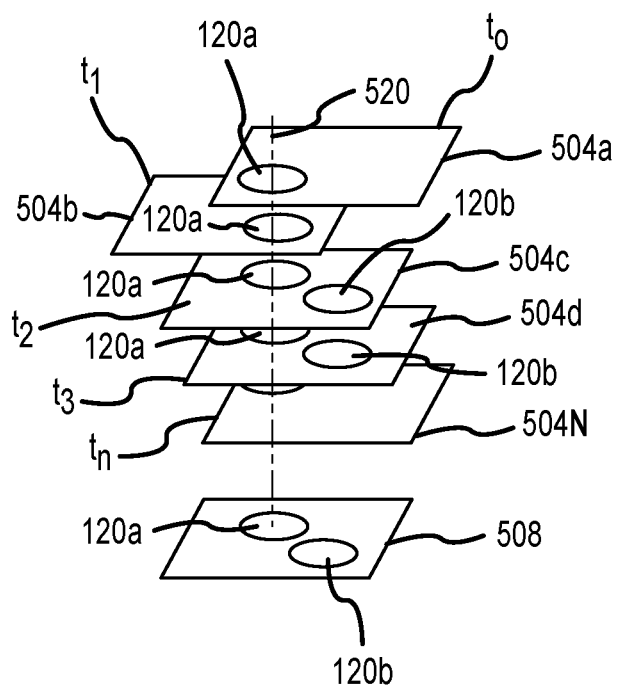
FIG. 5 depicts an example of single object registration in accordance with embodiments of the present disclosure.

The aggregation of multiple image frames 504a-n collected at different times $t_0$ to $t_n$ to form a composite or co-added frame 508 is illustrated in FIG. 5. As depicted in the figure, image data from one or more dim objects 120 may be present in at least some of the image frames 504, in the form of a signal from one or more pixels 210 within the respective image frames 504. In this example, image data corresponding to the first dim object 120a is present in all of the image frames 504a-n, while image data corresponding to the second dim object 120b is present in only two of the image frames 504c and 504d. Moreover, whether or not image data corresponding to a dim object 120 is present in some or all of the image frames 504, the strength of that signal may be insufficient for that signal to register as an object. For instance, it may be impossible to distinguish that signal from noise. Accordingly, it is desirable to aggregate the signals from the multiple frames 504a-n, in order to enable or facilitate the detection of the dim objects 120. Because the location of the dim objects 120, within each individual frame 504 varies as the platform 104 and/or the multiple mode star tracker 108 moves relative to the ECI, accurate co-addition and thus accurate detection of the objects 120 requires that the image frames 504a-n be aligned along a common boresight or reference axis 520. By registering the data from each image frame 504 in the same way relative to the ECI, signals collected from the same location in space by the different image frames 504 can be added to form the composite frame 508. More particularly, embodiments of the present disclosure determine the attitude quaternion for each pixel 210, enabling the image data to aligned with respect to a common reference (e.g. the ECI). As a result, the composite frame can include image data in which one or more signals from dim objects 120 are apparent, even if those signals are not distinct from noise in some or all of the image data from any one of the frames 504. This alignment of the multiple frames of image data is performed at step 328. In accordance with embodiments of the present disclosure, the accurate alignment of the frames is accomplished using the attitude quaternion for each pixel in each frame. By thus co-adding the frames of image data, the signals obtained from the same points in space can be accurately aligned, enabling enough signal to be accumulated to obtain an image of dim objects. Therefore, embodiments of the present disclosure avoid the need to reference gyroscopic or other data in the form of roll, pitch, and yaw information. Moreover, the process of embodiments of the present disclosure does not require relatively complex analytical pixel registration algorithms, which can be computationally intensive. Instead, embodiments of the present disclosure utilize the already computed attitude quaternion to enable accurate co-addition of multiple frames of image data. The resulting co-added image can then be output (step 332).

The composite image 508 can be output to a display. Alternatively or in addition, the composite image 508 can be output to a neural network, threshold detector, or other processing system for automated analysis. The human or automated analysis of the composite image 508 can include a determination as to whether a dim objects 120 has been detected within the composite image 508 data. Action can then be taken in response to the analysis. Such action can include indicating that the composite image 508 includes a dim object 120. The composite image 508 can then be subjected to additional analysis, archiving, or other action. Whether or not a composite image is marked as being of interest, the analysis process can operate the multiple mode star tracker 108 to aggregate additional frames 504 of image data to create one or more additional composite images 508. Such additional composite images 508 can include the original composite image 508, or can be comprised of data from the image frames 504 collected subsequent to the image frames 504 making up the first composite image 508. Where a dim object 120 has been detected in a series of composite images 508, such action can include a direction to move the platform 104 or to otherwise adjust the field of view 116 of the mode star tracker 108 in order to track a moving object 120. Moreover, operation of the multiple mode star tracker 108 to collect frames of image data 504 can be continued at the same time that composite images 508 are being generated by the multiple mode star tracker 108 or by other processing systems in communication with the multiple mode star tracker 108. Accordingly, the generation of composite images 508 can be performed in real-time or near real time. Alternatively or in addition, the generation of composite images 508 can be performed minutes, hours, days, or even years after the individual image frames 504 used to generate the composite image 508 were created. In accordance with still further embodiments of the present disclosure a series of composite images 508 aggregating different numbers of individual image frames 504, and thus providing different levels of sensitivity, can be generated. Moreover, a composite image 508 providing a higher level of sensitivity can incorporate image data from one or more composite images 508 providing lower levels of sensitivity and/or individual image frames 504 used in the creation of composite frames 508 having lower levels of sensitivity.

At step 336, a determination can be made as to whether operation of the multiple mode star tracker 108 is to continue. If operation is to continue, the process can return to step 304, and an additional frame of image information can be collected. Otherwise, the process can end.

As can be appreciated by one of skill in the art after consideration of the present disclosure, the operation of the multiple mode star tracker 108 in a traditional star tracker function to determine the attitude of the multiple mode star tracker 108 can be performed in parallel with the collection of image data. In addition, the number of frames of image data 504 that are co-added as part of an imaging function of the multiple mode star tracker 108 can be varied, depending on the intensity of the object or objects of interest within the operable field of view of the multiple mode star tracker 108. For example from 2 to 40,000 individual frames of image data 504 can be combined to create a composite image 508. As another example, from 20 to 20,000 frames of image data 504 can be combined to create a composite image 508. Furthermore, postprocessing of the collected images can be performed in near real-time, or sometimes following collection, on the platform 104 carrying the multiple mode star tracker 108, by the processor 212 of the multiple mode star tracker 108 itself, or can be performed by a remote system provided with the image and quaternion information from the multiple mode star tracker 108.

A multiple mode star tracker 108 in accordance with embodiments of the present disclosure is not limited to the detection of dim objects 120. In particular, an individual frame 504 of image data in which an image of an object is apparent is available for viewing or analysis from that single frame 504 of image data. Accordingly, embodiments of the present disclosure provide a multiple mode star tracker 108 that is capable of supporting space situational awareness (SSA) functions that include the detection of both bright objects (i.e. objects visible from a single frame 504 of image data) and dim objects 120 (i.e. objects that are only visible in a composite image 508 formed from two or more single frames 504 of image data), at the same time that attitude information is generated by the multiple mode star tracker 108.

Embodiments of the present disclosure provide a multiple mode star tracker 108 that allows full frame imaging simultaneously with attitude determination in a time tagged format. Embodiments the present disclosure further provide a method to register every pixel 210 within a frame of image data 504 with respect to any inertial reference frame. More particularly, the attitude quaternion is used register each pixel 210 in the series of individual frames 504 or collected video with respect to an IRF during some spatial motion of the detector 208 focal plane. The spatial motion of the platform 104 and the spatial motion of each pixel 210 in the video is registered via the quaternion. Postprocessing multiple video frames, where each pixel 210 is registered to an IRF further allows stacking of the frames 504 in order to significantly boost SNR. Such a technique enables detection of very dim objects 120 once multiple frames 504 of image data have been stacked to create a composite image 508.

Embodiments of the present disclosure do not require an external gyroscope that provides attitude information for pixels within the frames of image data. In addition, embodiments of the present disclosure do not rely on analytical pixel registration algorithms that can be computationally intensive. Moreover, embodiments of the present disclosure rely on already computed attitude quaternion information, and provide a multiple mode star tracker 108 that can simultaneously output attitude information and full frame images. Postprocessing of the quaternion registered pixels can be accomplished either on or off the multiple mode star tracker 108. The quaternion full frame pixel registration method disclosed herein provides a cost-effective solution to imaging dim objects 120 that require increased SNR compared to standard operational situational awareness cameras. The method relies only on already computed attitude quaternion information, without the need for an external gyroscope or computationally expensive pixel registration algorithms. Methods as disclosed herein can include using a star tracker to obtain attitude information, and further to obtain multiple images that are combined or stacked to detected dim objects such as faint, distant satellites in space situational awareness and other missions. Methods include capturing a plurality of images of the stars and faint objects of interest in the multiple mode star tracker 108 field of view 116, and registering every pixel 210 in each frame with respect to a time and to any inertial reference frame. An example of an applicable IRF is the J 2000 defined with the Earth's meaning equator and equinox at 12:00 terrestrial time on 1 Jan. 2000. The x-axis is aligned with the mean equinox. The z-axis is aligned with the Earth spin axis or celestial North Pole. The Y axis is rotated by 90° east about the celestial equator. The attitude quaternion (the slew vector of the multiple mode star tracker 108 on the platform 104) is used to register each pixel 210 in the collected video with respect to an IRF during some spatial motion of the detector 208 focal plane 209.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method, comprising:
obtaining a plurality of frames of image data from within a field of view containing a plurality of stars, wherein all of the frames of image data at least partially overlap with one another, and wherein each frame of image data in the plurality of frames of image data is obtained using a multiple pixel image sensor;
determining an attitude quaternion for a plurality of the pixels of the multiple pixel image sensor; and
applying the attitude quaternion for each of the plurality of the pixels within each frame of image data to align the image data across the plurality of frames of image data.

2. The method of claim 1, further comprising:
adding a number of the frames of image data to one another to form at least a first composite image.

3. The method of claim 2, wherein determining the attitude quaternion includes applying at least one of the frames of image data from within the field of view containing a plurality of stars to reference data.

4. The method of claim 3, wherein the attitude quaternion for each pixel in the plurality of pixels locates the respective pixel relative to an inertial reference frame.

5. The method of claim 4, wherein the inertial reference frame is an Earth centered inertial coordinate frame.

6. The method of claim 2, further comprising, prior to forming the at least a first composite image, registering the plurality of pixels in the number of frames of image data to one another.

7. The method of claim 6, further comprising:
outputting the first composite image.

8. The method of claim 7, further comprising:
determining from the first composite image that a first object is present in the field of view.

9. The method of claim 2, wherein the first composite image is generated from a first number of frames of image data, the method further comprising:
generating a second composite image from a second number of frames of image data, wherein the second number is greater than the first number.

10. The method of claim 9, wherein the frames of image data used to generate the first composite image are included in the frames of image data used to generate the second composite image.

11. The method of claim 10, wherein a first object is visible in the first composite image, wherein the first object and a second object are visible in the second composite image, and wherein the second object is not visible in the first composite image.

12. The method of claim 2, wherein the plurality of frames of image data are obtained by a sensor carried by a mobile platform.

13. The method of claim 3, wherein the mobile platform is a satellite.

14. The method of claim 5, wherein the first composite image includes image data from at least 20 frames of image data.

15. A multiple mode star tracker, comprising:
a lens assembly;
a detector, wherein the detector includes an array of pixels that receive light collected by the lens assembly from within a field of view that encompasses a plurality of stars;
a processor, wherein the processor is operable to execute application programming to:
operate the detector to obtain a plurality of frames of image data from within the first field of view;
identify stars included in a first frame of image data included in the plurality of frames of image data;
from the identified stars within the first frame of image data, determine an attitude quaternion of each of the pixels at the time the first frame of image data was collected;
identify the stars included in a second frame of image data included in the plurality of frames of image data;
from the identified stars within the second frame of image data, determine an attitude quaternion of each of the pixels at the time the second frame of image data was collected; and
forming a composite image that combines the first and second frames of image data.

16. The multiple mode star tracker of claim 15, wherein the detector implements a global shutter function such that, for each frame of image data, each pixel in the detector has the same absolute exposure period.

17. The multiple mode star tracker of claim 16, further comprising:
an output device, where the composite image is displayed by the output device.

18. The multiple mode star tracker of claim 16, wherein the detector includes a back side illuminated complementary metal oxide semiconductor focal plane array.

19. A method for providing attitude and image information, comprising:
collecting a plurality of frames of image data by a detector having an array of pixels, wherein each frame of image data includes images of a plurality of stars;

for each of the frames of image data, determining an attitude quaternion of the detector by comparing the image of the plurality of stars in a respective frame to reference data;

from the determined attitude quaternion of the detector, determining an attitude quaternion of a plurality of the pixels of the detector for each of the frames of image data;

aligning a first one of the frames of image data with a second one of the frames of image data, wherein multiple pixels from the first frame of image data are aligned with multiple pixels of the second frame of image data according to the determined attitude quaternions for the pluralities of pixels in the first and second frames of image data; and generating a composite image from the aligned multiple pixels of the first and second frames of image data.

20. The method of claim 19, further comprising:

identifying a first object in the composite image.

\* \* \* \* \*

UNITED STATES PATENT AND TRADEMARK OFFICE
CERTIFICATE OF CORRECTION

PATENT NO. : 10,761,182 B2
APPLICATION NO. : 16/693992
DATED : September 1, 2020
INVENTOR(S) : Emil Tchilian Page 1 of 1

It is certified that error appears in the above-identified patent and that said Letters Patent is hereby corrected as shown below:

In the Claims

In Claim 13, Column 10, Line 20, delete "3" and insert --12-- therefore; and
In Claim 15, Column 10, Line 35, following "image data from within the", delete "first".

Signed and Sealed this
Twenty-second Day of December, 2020

Andrei Iancu
*Director of the United States Patent and Trademark Office*